United States Patent
Fujita

(10) Patent No.: US 9,088,760 B2
(45) Date of Patent: Jul. 21, 2015

(54) CONTROL APPARATUS AND METHOD FOR CONTROLLING DISPLAY APPARATUS

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 13/540,197

(22) Filed: Jul. 2, 2012

(65) Prior Publication Data

US 2013/0010133 A1 Jan. 10, 2013

(30) Foreign Application Priority Data

Jul. 4, 2011 (JP) .................................. 2011-148620

(51) Int. Cl.
*H04N 5/765* (2006.01)
*H04N 5/77* (2006.01)
*H04N 5/781* (2006.01)

(52) U.S. Cl.
CPC ................. *H04N 5/765* (2013.01); *H04N 5/77* (2013.01); *H04N 5/781* (2013.01)

(58) Field of Classification Search
CPC ....................... H04N 2101/00; H04N 5/23293
USPC ....................................................... 348/207.1
See application file for complete search history.

(56) References Cited

U.S. PATENT DOCUMENTS

| 5,897,623 A * | 4/1999 | Fein et al. .................... 705/26.8 |
| 2005/0024513 A1 * | 2/2005 | Hayashi et al. ........... 348/333.01 |
| 2010/0159831 A1 * | 6/2010 | Matsushima et al. ........ 455/41.2 |
| 2011/0149107 A1 * | 6/2011 | Tsukikawa ................. 348/222.1 |

FOREIGN PATENT DOCUMENTS

JP 2010-011419 A 1/2010

* cited by examiner

*Primary Examiner* — Roberto Velez
*Assistant Examiner* — Cynthia Segura
(74) *Attorney, Agent, or Firm* — Fitzpatrick, Cella, Harper & Scinto

(57) ABSTRACT

A control apparatus receives at least one image data transmitted from an external apparatus to the control apparatus, stores the at least one image data on a storage medium, and detects whether or not a predetermined instruction is received by the control apparatus. The control apparatus causes a display apparatus to display a menu relating the at least one image data if the predetermined instruction is received by the control apparatus after the control apparatus starts receiving the at least one image data from the external apparatus and before a predetermine time has elapsed. The control apparatus causes the display apparatus to display a list of image data stored in the storage medium if the predetermined instruction is received by the control apparatus after the control apparatus starts receiving the at least one image data from the external apparatus and after the predetermine time has elapsed.

26 Claims, 5 Drawing Sheets

F I G. 1
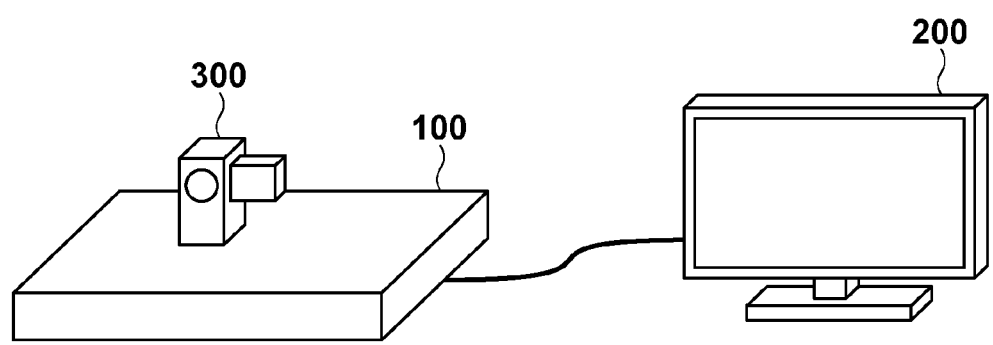

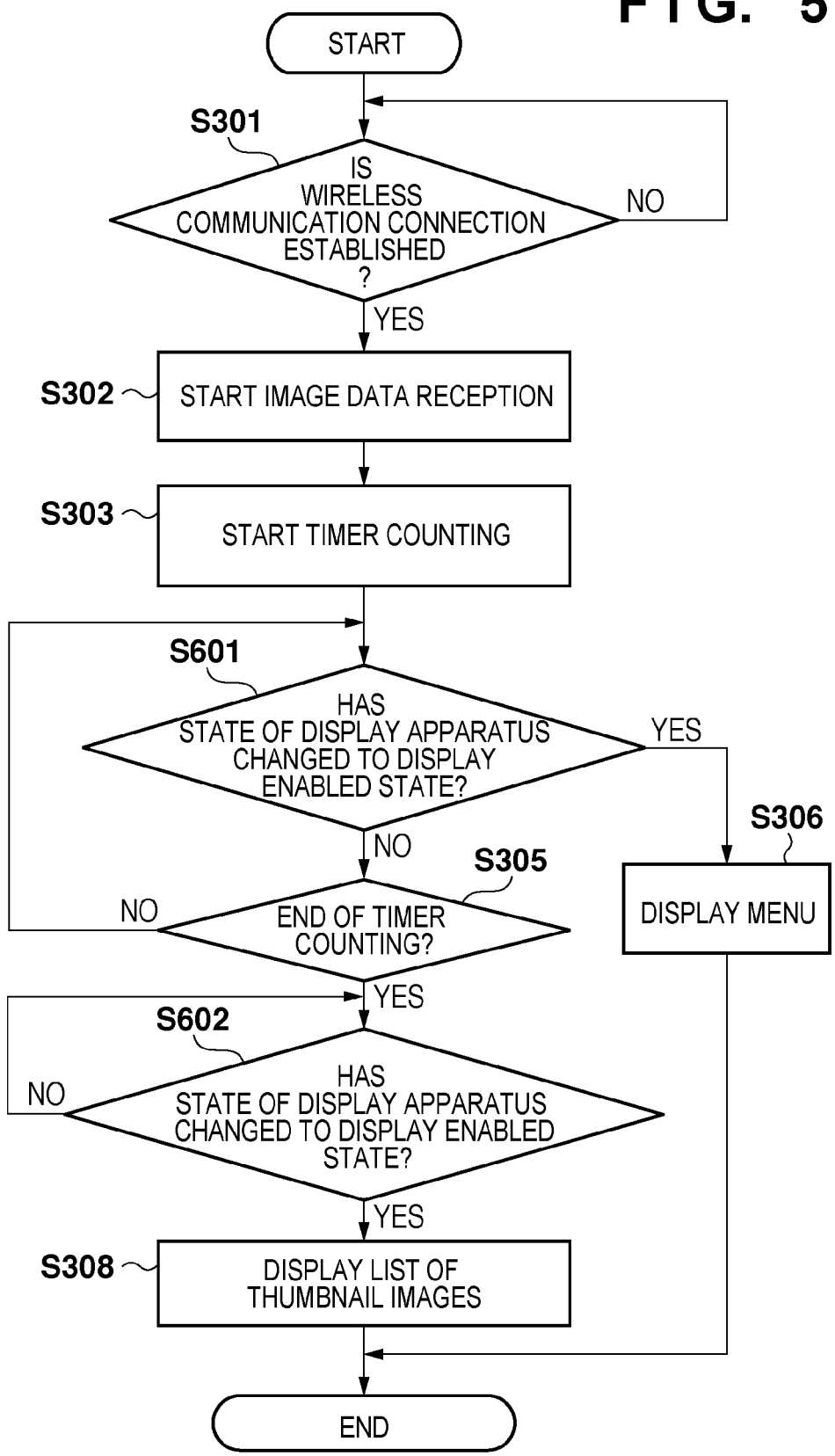

CONTROL APPARATUS AND METHOD FOR CONTROLLING DISPLAY APPARATUS

BACKGROUND OF THE INVENTION

1. Field of the Invention

The present invention relates to a technique of controlling a display apparatus.

2. Description of the Related Art

With the popularization of image capture apparatuses such as digital cameras and digital video cameras, the methods of storing still images and moving images captured by an image capture apparatus are changing. Conventionally, methods of storing still images in a photographic medium and moving images in an analog recording medium, such as a video tape, were the mainstream. However nowadays, the method of storing still images and moving images in a digital recording medium such as an HDD is the mainstream.

With the method of storing data captured by an image capture apparatus in a recording apparatus, including a digital recording medium, generally the method of connecting the image capture apparatus or the recording medium to the recording apparatus by wire is employed, but recently various other methods have been proposed. Japanese Patent Laid-Open No. 2010-011419 proposes a system which automatically transmits an image data stored in a communication device, to an external apparatus by simple operation of a user.

For example, data transfer using near field wireless communication, as described in Japanese Patent Laid-Open No. 2010-011419, assumes home use. The system disclosed in this patent literature allows a user to store a desired image data in a home server such as a PC or an HDD recorder and browse the stored image data on a display apparatus such as a digital television.

However, when the user browses the desired image data stored in the home server as described above, the user must search the home server for the desired image data, select the desired image data, and give an instruction for reproducing the desired image data. For example, when the user wants to browse the desired image data immediately after the desired image data is transferred to a home server, he or she is forced to perform a complicated operation in order to browse the desired image data, and this operation takes time.

SUMMARY OF THE INVENTION

The present invention has been made in consideration of the above-mentioned related art technique. For example, an apparatus and a method for helping a user to play back at least one image data transferred from an external device will be provided.

The present invention in its first aspect provides a control apparatus comprising: a receiving unit that receives at least one image data transmitted from an external apparatus to the control apparatus; a storing unit that stores the at least one image data on a storage medium; a detecting unit that detects whether or not a predetermined instruction is received by the control apparatus; and a control unit that (a) causes a display apparatus to display a menu relating the at least one image data if the predetermined instruction is received by the control apparatus after the control apparatus starts receiving the at least one image data from the external apparatus and before a predetermine time has elapsed, and (b) causes the display apparatus to display a list of image data stored in the storage medium if the predetermined instruction is received by the control apparatus after the control apparatus starts receiving the at least one image data from the external apparatus and after the predetermine time has elapsed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 1 is a view for explaining a system configuration according to the first and second exemplary embodiments;

FIG. 5 is a flowchart for explaining a second display control process performed in the second exemplary embodiment.

DESCRIPTION OF THE EMBODIMENTS

Figure 2:
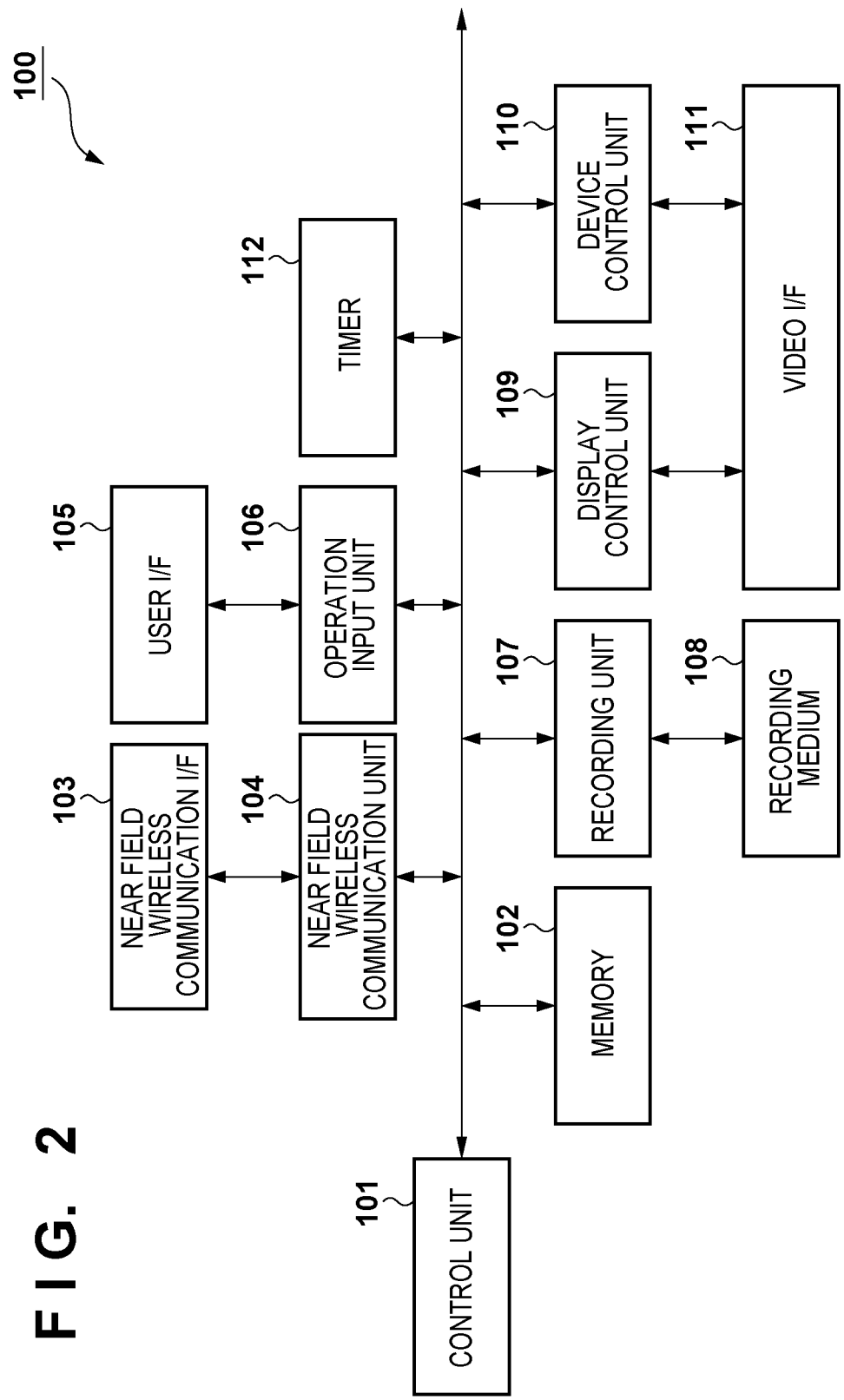
FIG. 2 is a block diagram for explaining a functional configuration of a control apparatus 100 according to the first and second exemplary embodiments.

Various exemplary embodiments, features, and aspects of the present invention will be described in detail below with reference to the drawings. Note that in exemplary embodiments to be described below, a home server capable of receiving image data including a still image or a moving image using near field wireless communication, and displaying the received image data on a display apparatus connected to the home server, will be taken as an example of a control apparatus. However, the present invention is not limited to a home server capable of near field wireless communication, and is applicable to a device capable of receiving an image data including a still image or a moving image, and displaying the received image data on a display apparatus connected to the device.

Also, in this specification, "near field wireless communication" means wireless communication based on a communication protocol assuming that a communication range is smaller than 1 m and, especially, smaller than several ten centimeters. A "vicinity type" communication protocol, that specifies a communication range of about 70 cm or less, is known as one example of such a communication protocol. A "proximity type" contactless communication protocol, that specifies a communication range of about 10 cm or less, is also known as one example of such a communication protocol. For example, there are standards such as ISO/IEC 15693, ISO/IEC 14443, and ECMA-340 (ISO/IEC 18092) are known as standards related to "near field wireless communication".

First Exemplary Embodiment

FIG. 1 is a view for explaining a system configuration according to the first and second exemplary embodiments. A control apparatus 100 may be configured to act as a computer (e.g., a personal computer) or a server (e.g., a home server). A display apparatus 200 may be configured to act as a digital television. An external apparatus 300 may be configured to act as a digital camera, a digital video camera or a mobile phone. However, the control apparatus 100 is not limited to the computer or the server, the display apparatus 200 is not limited to the digital television, and the external apparatus 300 is not limited to the digital camera, the digital video camera or the mobile phone. The control apparatus 100 receives at least one image data using near field wireless communication from the external apparatus 300 placed near a near field wireless communication I/F 103 included in the control apparatus 100. Each image data received from the external apparatus 300 includes, for example, a still image or a moving image. Also, the display apparatus 200 is connected to the control apparatus 100 by wire. Note that in the first and second exemplary embodiments, the control apparatus 100 and the display apparatus 200 are connected to each other via an HDMI (High-Definition Multimedia Interface) cable for video data transmission, so video and audio data can be transmitted between them. Also, in the HDMI, the CEC (Consumer Electronics Control) protocol is standardized, so mutual device control can be performed using message communication based on the CEC protocol. For example, the control apparatus 100 and the display apparatus 200 can determine each other's states and control specific operations using message communication based on the CEC protocol.

Although the control apparatus 100 and the display apparatus 200 are connected to each other via an HDMI cable to allow mutual control in the first and second exemplary embodiments, the exemplary embodiments are not limited to this connection method.

FIG. 2 is a block diagram for explaining the functional configuration of the control apparatus 100 according to the first and second exemplary embodiments.

A control unit 101 is, for example, a CPU (Central Processing Unit) and controls the operation of each block included in the control apparatus 100 using a program for controlling each block included in the control apparatus 100. A memory 102 is a rewritable volatile memory and is used as, for example, a temporal storage area for data generated during the operation of each block.

The near field wireless communication I/F 103 is a communication interface for performing near field wireless communication using, for example, the NFC technology. The near field wireless communication I/F 103 allows data transmission/reception between the near field wireless communication I/F 103 and the external apparatus 300 which exists within a communication range and is capable of near field wireless communication. A near field wireless communication unit 104 is a block which controls data transmission/reception between the near field wireless communication I/F 103 and the external apparatus 300 which exists within the communication range. The near field wireless communication unit 104 detects whether or not the external apparatus 300 capable of near field wireless communication exists within the communication range of the near field wireless communication I/F 103. If the external apparatus 300 exists within the communication range, the near field wireless communication unit 104 establishes a near field wireless communication connection between the external apparatus 300 and the control apparatus 100, and notifies the control unit 101 that the near field wireless communication connection is established. In contrast, if the external apparatus 300 which exists within the communication range is removed from the communication range, the near field wireless communication unit 104 disconnects the near field wireless communication connection, and notifies the control unit 101 that the near field wireless communication connection is disconnected. Also, the near field wireless communication unit 104 stores, in the memory 102, at least one image data received from the external apparatus 300 via the near field wireless communication I/F 103.

A recording unit 107 is a block which controls reading of image data from a recording medium 108 which is connected to the recording unit 107, and controls writing of image data to the recording medium 108. For example, the recording unit 107 is configured to act as a storing unit, and the recording medium 108 is configured to act as a storage medium. The recording unit 107 reads out image data which is received by the near field wireless communication unit 104 from the external apparatus 300 placed near the control apparatus 100 and is stored in the memory 102. The recording unit 107 records the image data read out from the memory 102 on the recording medium 108. Also, when the image data recorded on the recording medium 108 is displayed on the display apparatus 200 connected to the control apparatus 100, the recording unit 107 reads out the image data to be displayed from the recording medium 108, and outputs the image data to a display control unit 109. The recording medium 108 is an internal memory included in the control apparatus 100, or a recording device, such as a memory card or HDD (hard disk drive), detachably connected to the control apparatus 100. The recording unit 107 receives at least one image data received by the near field wireless communication unit 104, and records the received image data on the recording medium 108.

To display the image data recorded on the recording medium 108 on the display apparatus 200 connected to the control apparatus 100, the display control unit 109 converts the image data input from the recording unit 107 to the display control unit 109 into video data suitable for the display apparatus 200, and outputs the video data to a video I/F 111. The video I/F 111 is an interface for outputting the video data from the control apparatus 100 to the external display apparatus 200. The video I/F 111 outputs the video data input from the display control unit 109 to the video I/F 111 to the display apparatus 200 connected to the control apparatus 100. Note that in the first and second exemplary embodiments, the video I/F 111 has, for example, an HDMI terminal. In this case, the display control unit 109 converts the image data output from the recording unit 107 into video data in a non-compression format based on an HDMI, and outputs the video data to the video I/F 111.

Also, when the video I/F 111 has an HDMI terminal, the state of the display apparatus 200 can be checked by transmitting a message based on the CEC protocol to the display apparatus 200. A device control unit 110 is a block which generates, in accordance with an instruction from the control unit 101, a message which is based on the CEC protocol and is to be transmitted to the display apparatus 200. The device control unit 110 transmits the generated message to the display apparatus 200 via the video I/F 111. For example, a "One Touch Play" function based on the CEC protocol will be used by the control unit 101 to control the display apparatus 200. When the "One Touch Play" function is used by the control unit 101, the control unit 101 can turn on the power of the display apparatus 200, and cause the display apparatus 200 to display video data transmitted from the control apparatus 100. When the "One Touch Play" function is used by the control unit 101, the device control unit 110 generates, in accordance with an instruction from the control unit 101, messages for carrying out the "One Touch Play" function, and transmits the generated messages to the display apparatus 200 via the video I/F 111. Note that the device control unit 110 can detect a power state and an external input state of the display apparatus 200 by transmitting, to the display apparatus 200, a "Give Device Power Status" message for requesting information about the power state of the display apparatus 200 and a "Routing Change" message for requesting information about the external input state of the display apparatus 200.

A user I/F 105 is an interface which is included in the control apparatus 100 and detects a user operation. The user I/F 105 includes, for example, operation members such as a power supply button and a playback button, and an infrared light receiving unit which accepts a user operation input using a remote controller. The user I/F 105 transmits a signal corresponding to the user operation to an operation input unit 106. The operation input unit 106 analyzes the signal transmitted from the user I/F 105, and notifies the control unit 101 of an instruction corresponding to the user operation. Also, a timer 112 is an internal timer included in the control apparatus 100 and is used to, for example, generate a clock for a given process and measure the elapsed time.

(First Display Control Process)

Figure 3:
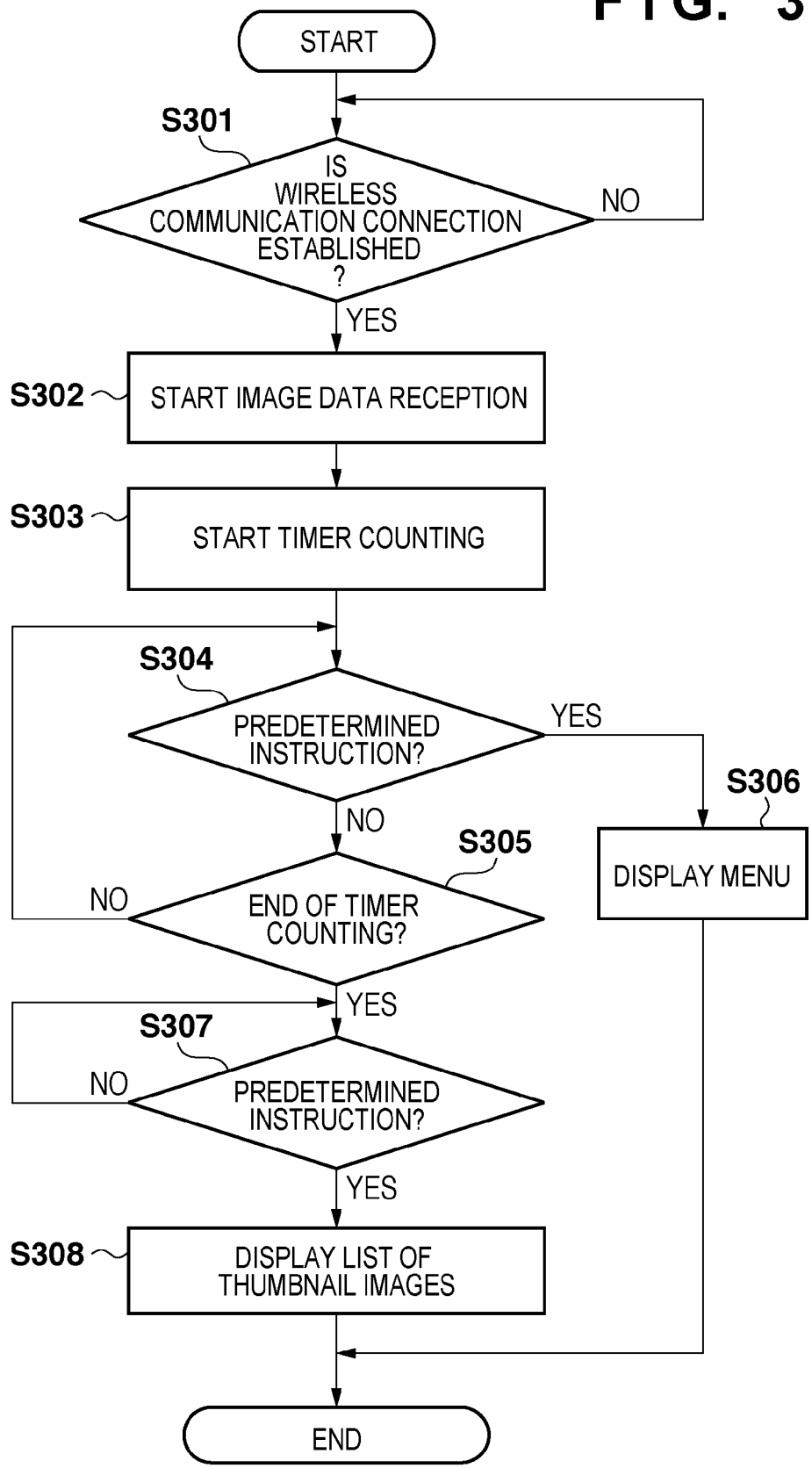
FIG. 3 is a flowchart for explaining a first display control process performed in the first exemplary embodiment.

A first display control process performed by the control apparatus 100 according to the first exemplary embodiment will be described below with reference to a flowchart shown in FIG. 3. The first display control process corresponding to the flowchart shown in FIG. 3 can be carried out by executing, by the control unit 101, a program stored in a nonvolatile memory. Note that the following first exemplary embodiment assumes that the first display control process starts when, for example, the control apparatus 100 is powered on.

In step S301, the control unit 101 determines whether or not the external apparatus 300 is removed within the communication range of the control apparatus 100, and determines whether or not a near field wireless communication connection between the external apparatus 300 and the control apparatus 100 is established. For example, the control unit 101 determines whether or not the near field wireless communication unit 104 has detected that the external apparatus 300 is removed within the communication range of the near field wireless communication unit 104, and determines whether or not the near field wireless communication unit 104 has established the near field wireless communication connection between the external apparatus 300 and the control apparatus 100. If the near field wireless communication connection is established, the control unit 101 advances to step S302 (YES in step S301); otherwise, the control unit 101 repeats step S301 (NO in step S301).

In step S302, the control unit 101 causes the near field wireless communication unit 104 to start receiving at least one image data from the external apparatus 300 via the near field wireless communication I/F 103. At least one image data transmitted from the external apparatus 300 is selected by the external apparatus 300, the control apparatus 100 or the user. Each image data transmitted from the external apparatus 300 includes, for example, a still image or a moving image. The image data received by the near field wireless communication unit 104 is temporarily stored in the memory 102, is read out by the recording unit 107 at an appropriate timing, and is recorded on the recording medium 108. Note that the image data received by the control apparatus 100 from the external apparatus 300 via the near field wireless communication connection is not limited to one image data. For example, at least one image data selected by operating the external apparatus 300 may be transmitted from the external apparatus 300 to the control apparatus 100. In step S303, the control unit 101 causes the timer 112 to start counting in response to the start of reception of at least one image data in step S302.

In step S304, the control unit 101 determines whether or not a predetermined instruction X1 is input from the user to the control apparatus 100. An instruction for displaying, on the display apparatus 200 connected to the control apparatus 100, a list of image data recorded on the recording medium 108 is example of the predetermined instruction X1. For example, the control unit 101 determines whether or not the operation input unit 106 notifies the control unit 101 that the operation input unit 106 detects the predetermined instruction X1 from the user. If the control unit 101 determines that the predetermined instruction X1 is input from the user to the control apparatus 100, the control unit 101 advances to step S306 (YES in step S304); otherwise, the control unit 101 advances to step S305 (NO in step S304).

In step S305, the control unit 101 determines whether or not a predetermined time T1 has elapsed after the start of reception of image data in step S302. For example, the control unit 101 refers a counted value of the timer 112, and compares the counted value with information corresponding to the predetermined time T1, thereby determining whether or not the predetermined time T1 has elapsed. If the predetermined time T1 has elapsed after the start of reception of image data in step S302, the control unit 101 advances to step S307 (YES in step S305); otherwise, the control unit 101 returns to step S304 (NO in step S305). For example, the control unit 101 repeats steps S304 and S305 while the predetermined time T1 has elapsed after the start of reception of image data in step S302, and advances to step S306 when the predetermined instruction X1 is input from the user to the control apparatus 100 within the predetermined time T1. Note that the predetermined time T1 can be changed by, for example, the user. For example, the predetermined time T1 can be set from 1 to 300 seconds.

Figure 4A:
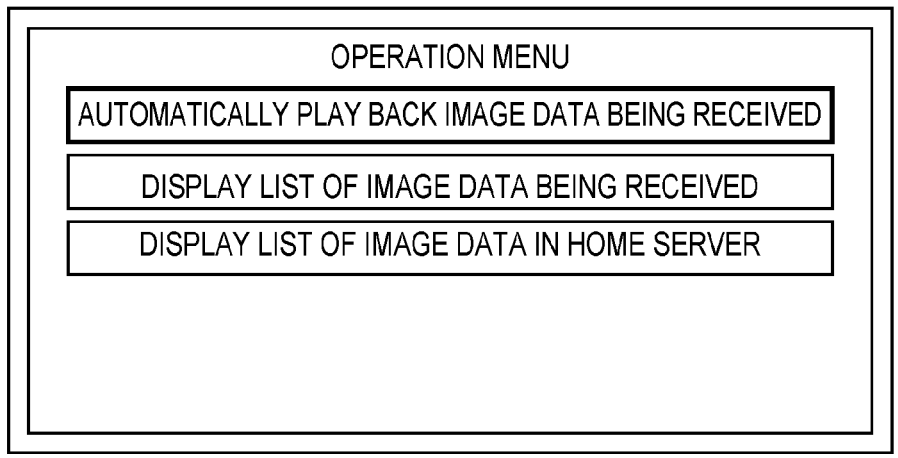
FIGS. 4A, 4B, and 4C are views illustrating GUIs (Graphical User Interfaces) displayed on a display apparatus 200.
Figure 4B:
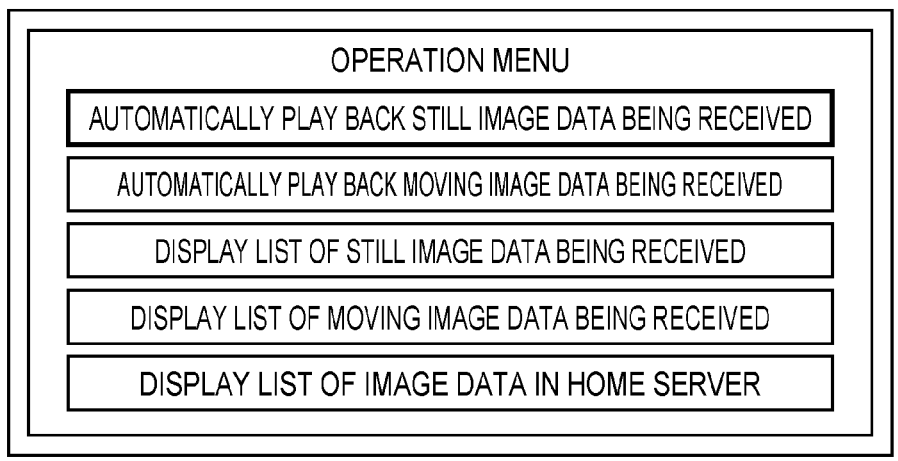

In step S306, the control unit 101 causes the display apparatus 200 connected to the control apparatus 100 to display a first operation menu or a second operation menu for operating the control apparatus 100. The first operation menu and the second operation menu are graphical user interfaces (GUIs) for controlling of the control apparatus 100. For example, the control unit 101 reads out data corresponding to one of the first operation menu and the second operation menu from a nonvolatile memory, and transmits the data corresponding to one of the first operation menu and the second operation menu to the display control unit 109. The control unit 101 causes the display control unit 109 to generate video data including one of the first operation menu and the second operation menu, and causes the display control unit 109 to transmit the video data including one of the first operation menu and the second operation menu to the display apparatus 200 via the video I/F 111. For example, the video data including the first operation menu is displayed on the display apparatus 200 as shown in FIG. 4A. For example, the video data including the second operation menu is displayed on the display apparatus 200 as shown in FIG. 4B. The user may use the user I/F 105 to operate the first operation menu and the second operation menu.

As shown in FIG. 4A, the first operation menu may include three buttons for controlling the control apparatus 100. However, the first operation menu is not limited to an operation menu as shown in FIG. 4A. The first operation menu is configured to help the user to play back at least one image data being received from the external apparatus 300. For example, when a first button in the first operation menu is operated by the user, the control apparatus 100 may automatically play back at least one image data being received by the control apparatus 100 from the external apparatus 300 via the near field wireless communication connection. When a second button in the first operation menu is operated by the user, the control apparatus 100 may generate one or more thumbnail images from at least one image data being received by the control apparatus 100 from the external apparatus 300 via the near field wireless communication connection, generate video data including a list of the generated thumbnail images, and cause the display apparatus 200 to display the generated video data. When a third button in the first operation menu is operated by the user, the control apparatus 100 may select one or more image data from the image data recorded on the recording medium 108, generate one or more thumbnail images from the selected image data, generate video data including a list of the generated thumbnail images, and cause the display apparatus 200 to display the generated video data.

As shown in FIG. 4B, the second operation menu may include five buttons for controlling the control apparatus 100. However, the second operation menu is not limited to an operation menu as shown in FIG. 4B. The second operation menu is configured to help the user to play back at least one image data being received from the external apparatus 300. For example, when a first button in the second operation menu is operated by the user, the control apparatus 100 may automatically play back at least one still image data being received by the control apparatus 100 from the external apparatus 300 via the near field wireless communication connection. When a second button in the second operation menu is operated by the user, the control apparatus 100 may automatically play back at least one moving image data being received by the control apparatus 100 from the external apparatus 300 via the near field wireless communication connection. When a third button in the second operation menu is operated by the user, the control apparatus 100 may generate one or more thumbnail images from at least one still image data being received by the control apparatus 100 from the external apparatus 300 via the near field wireless communication connection, generate video data including a list of the generated thumbnail images, and cause the display apparatus 200 to display the generated video data. When a fourth button in the second operation menu is operated by the user, the control apparatus 100 may generate one or more thumbnail images from at least one moving image data being received by the control apparatus 100 from the external apparatus 300 via the near field wireless communication connection, generate video data including a list of the generated thumbnail images, and cause the display apparatus 200 to display the generated video data. When a fifth button in the second operation menu is operated by the user, the control apparatus 100 may select one or more image data from the image data recorded on the recording medium 108, generate one or more thumbnail images from the selected image data, generate video data including a list of the generated thumbnail images, and cause the display apparatus 200 to display the generated video data.

Note that when the control unit 101 uses the "One Touch Play" function in step S306, the control unit 101 can cause the device control unit 110 to generate the "Give Device Power Status" message and the "Routing Change" message, and can cause the device control unit 110 to transmit the generated messages to the display apparatus 200 via the video I/F 111. Thereby, the control unit 101 can acquire and recognize the power state and the external input state of the display apparatus 200. Furthermore, the control unit 101 can cause the device control unit 110 to generate messages for carrying out the "One Touch Play" function, and can cause the device control unit 110 to transmit the generated messages to the display apparatus 200 via the video I/F 111. Thereby, the display apparatus 200 can display the video data including one of the first operation menu and the second operation menu.

If the control unit 101 determines in step S305 that the predetermined time T1 has elapsed after the start of reception of image data in step S302, the control unit 101 determines in step S307 whether or not the predetermined instruction X1 is input from the user to the control apparatus 100. For example, the control unit 101 determines whether or not the operation input unit 106 notifies the control unit 101 that the operation input unit 106 receives, from the user, the predetermined instruction X1. If the control unit 101 determines that the predetermined instruction X1 is input from the user to the control apparatus 100, the control unit 101 advances to step S308 (YES in step S307); otherwise, the control unit 101 repeats step S307 (NO in step S307). Note that if new near field wireless communication connection between the external apparatus 300 and the control apparatus 100 is established during the repetition of step S307, the control unit 101 can forcibly end step S307 to start the first display control process again.

Figure 4C:
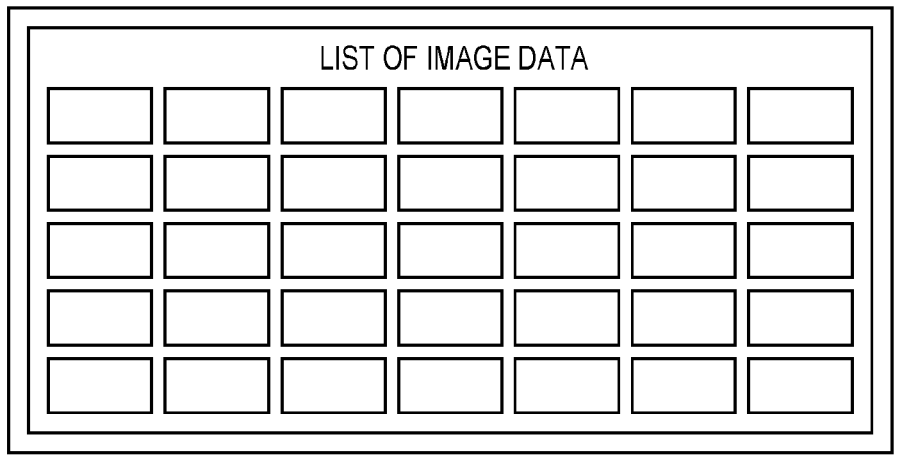

In step S308, the control unit 101 causes the display apparatus 200 connected to the control apparatus 100, to display a list of thumbnail images of at least one image data recorded on the recording medium 108. For example, the control unit 101 generates a list of thumbnail images of at least one image data selected by the control unit 101, and transmits the generated list of thumbnail images to the display control unit 109. The control unit 101 causes the display control unit 109 to generate video data including the generated list of thumbnail images, and causes the display control unit 109 to transmit the video data including the generated list of thumbnail images to the display apparatus 200 via the video I/F 111. For example, the video data including the generated list of thumbnail images is displayed on the display apparatus 200 as shown in FIG. 4C.

Note that when the control unit 101 uses the "One Touch Play" function is step S308, the same operation as in step S306 need be done. For example, the control unit 101 can cause the device control unit 110 to generate the "Give Device Power Status" message and the "Routing Change" message, and can cause the device control unit 110 to transmit the generated messages to the display apparatus 200 via the video I/F 111. Thereby, the control unit 101 can acquire and recognize the power state and the external input state of the display apparatus 200. Furthermore, the control unit 101 can cause the device control unit 110 to generate messages for carrying out the "One Touch Play" function, and can cause the device control unit 110 to transmit the generated messages to the display apparatus 200 via the video I/F 111. Thereby, the display apparatus 200 can display the video data including the list of thumbnail images generated in step S308.

Note that the control unit 101 determines whether or not the predetermined instruction X1 is input from the user to the control apparatus 100 in steps S304 and S307, but the predetermined instruction X1 is not limited to an instruction for displaying, on the display apparatus 200, a list of image data recorded on the recording medium 108.

As described above, the control apparatus 100 according to the first exemplary embodiment can help the user to play back at least one image data being received from the external apparatus 300. For example, when the reception of at least one image data from the external apparatus 300 is started, the control apparatus 100 determines whether or not the control apparatus 100 detects the predetermined instruction X1 within the predetermined time T1. If the control apparatus 100 determines that the control apparatus 100 detects the predetermined instruction X1 within the predetermined time T1, the control apparatus 100 can cause the display apparatus 200 to display the video data including one of the first operation menu and the second operation menu, and can allow the user to use the first operation menu or the second operation menu. The first operation menu are the second operation menu are used to help the user to play back at least one image data being received from the external apparatus 300. If the control apparatus 100 determines that the control apparatus 100 detects the predetermined instruction X1 after the predetermined time T1 has elapsed, the control apparatus 100 causes the display apparatus 200 to display the video data including the list of thumbnail images generated in step S308.

Thereby, the user can easily play back at least one image data being received by the control apparatus 100 from the external apparatus 300. For example, the user can play back at least one image data received by the control apparatus 100 from the external apparatus 300 without searching the recording medium 108 for the received image data.

Second Exemplary Embodiment

The second exemplary embodiment will be described below. Note that the functional configuration of the control apparatus 100 in the second exemplary embodiment is the same as in the first exemplary embodiment, and a description thereof will not be given.

(Second Display Control Process)

A second display control process performed by the control apparatus 100 according to the second exemplary embodiment will be described below with reference to a flowchart shown in FIG. 5. The second display control process corresponding to the flowchart shown in FIG. 5 can be carried out by executing, by the control unit 101, a program stored in a nonvolatile memory. Note that the following second exemplary embodiment assumes that the second display control process starts when, for example, the control apparatus 100 is powered on. In the second display control process, the same reference numerals as in the first display control process denote steps in which the same operations are executed, and a repetitive description thereof will not be given. In the second exemplary embodiment, the control apparatus 100 and the display apparatus 200 are connected to each other via an HDMI cable to allow mutual device control by transmission/reception of messages based on the CEC protocol. However, the second exemplary embodiment is not limited to this connection method.

After the control unit 101 causes the timer 112 to start counting in step S303, the control unit 101 determines in step S601 whether or not the display apparatus 200 has changed to a predetermined state (e.g., a display enabled state). When the display apparatus 200 is in the display enabled state, the display apparatus 200 can display video data transmitted from the control apparatus 100. For example, the control unit 101 causes the device control unit 110 to transmit the "Give Device Power Status" message, the "Routing Change" message and other messages based on the CEC protocol to the display apparatus 200 via a video I/F 111, and causes the device control unit 110 to detect whether or not the display apparatus 200 has changed the display enabled state. The device control unit 110 receives responses corresponding to the "Give Device Power Status" message, the "Routing Change" message and other messages, detects whether or not the display apparatus 200 has changed the display enabled state based on the received responses, and notifies the control unit 101 that the display apparatus 200 has changed to the display enabled state is detected or not. When the user changes the display apparatus 200 to the display enabled state within the predetermined time T1, the control unit 101 advances step S306 (YES in step S601). In step S601, when the control unit 101 determines that the display apparatus 200 is not changed to the display enabled state, the control unit 101 advances step S305 (NO in step S601).

If the control unit 101 determines in step S305 that the predetermined time T1 has elapsed after the start of reception of image data in step S302, the control unit 101 determines in step S602 whether or not the display apparatus 200 has changed to the display enabled state. For example, the control unit 101 causes the device control unit 110 to transmit the "Give Device Power Status" message, the "Routing Change" message and other messages based on the CEC protocol to the display apparatus 200 via a video I/F 111, and causes the device control unit 110 to detect whether the display apparatus 200 has changed the display enabled state. If the control unit 101 determines that the display apparatus 200 has changed to the display enabled state, the control unit 101 advances to step S308 (YES in step S602); otherwise, the control unit 101 repeats step S602 (NO in step S602). Note that if new near field wireless communication connection between the external apparatus 300 and the control apparatus 100 is established during the repetition of step S602, the control unit 101 can forcibly end step S602 to start the second display control process again.

As described above, the control apparatus 100 according to the second exemplary embodiment can help the user to play back at least one image data being received from the external apparatus 300. For example, when the reception of at least one image data from the external apparatus 300 is started, the control apparatus 100 determines whether or not the display apparatus 200 has changed to the display enabled state within the predetermined time T1. If the display apparatus 200 has changed to the display enabled state within the predetermined time T1, the control apparatus 100 can cause the display apparatus 200 to display the video data including one of the first operation menu and the second operation menu, and can allow the user to use the first operation menu or the second operation menu. The first operation menu are the second operation menu are used to help the user to play back at least one image data being received from the external apparatus 300. If the display apparatus 200 has changed to the display enabled state after the predetermined time T1 has elapsed, the control apparatus 100 causes the display apparatus 200 to display the video data including the list of thumbnail images generated in step S308. For example, the control apparatus 100 changes the process depending on the timing at which the display apparatus 200 connected to the control apparatus 100 changes from a display disabled state to the display enabled state after the start of reception of at least one content. If the display apparatus 200 has changed to the display enabled state within a predetermined time T1 after the start of reception, the control apparatus 100 causes the display apparatus 200 to output a menu display associated with playback of at least one content during its reception. However, if the display apparatus 200 has changed to the display enabled state upon elapse of the predetermined time T1 after the start of reception, the control apparatus 100 causes the display apparatus 200 to output a list display of contents recorded on a recording medium 108.

Thereby, the user can easily play back at least one image data being received by the control apparatus 100 from the external apparatus 300. For example, the user can play back at least one image data received by the control apparatus 100 from the external apparatus 300 without searching the recording medium 108 for the received image data.

Other Exemplary Embodiments

For example, aspects of the present invention can also be realized by a computer, CPU, or MPU of a system, apparatus, or device that executes a program which is stored in a non-transitory storage medium of a memory device, to perform the functions of the above-described embodiment(s).

While the present invention has been described with reference to the disclosed exemplary embodiments, it is to be understood that the present invention is not limited to the disclosed exemplary embodiments. The scope of the following claims is to be accorded the broadest interpretation so as to encompass all modifications and equivalent structures.

This application claims the benefit of Japanese Patent Application No. 2011-148620, filed Jul. 4, 2011, which is hereby incorporated by reference herein in its entirety.

What is claimed is:

1. A control apparatus comprising:
a receiving unit that receives at least one image data transmitted from an external apparatus to the control apparatus;
a storing unit that stores the at least one image data in a storage medium; and
a processor that (a) determines whether or not a predetermined instruction is inputted to the control apparatus after the control apparatus starts receiving the at least one image data from the external apparatus, (b) causes a display apparatus to display a menu that is used to help a user to play back the at least one image data if the predetermined instruction is inputted to the control apparatus after the control apparatus starts receiving the at least one image data from the external apparatus and before a predetermine time has elapsed, (c) determines whether or not the predetermined instruction is inputted to the control apparatus after the predetermined time has elapsed if the predetermined instruction is not inputted to the control apparatus within the predetermine time, and (d) causes the display apparatus to display a list of image data stored in the storage medium instead of displaying the menu if the predetermined instruction is not inputted to the control apparatus within the predetermine time but the predetermined instruction is inputted to the control apparatus after the predetermine time has elapsed,
wherein at least one of the receiving unit and the storing unit has a hardware structure.

2. The control apparatus according to claim 1, wherein the receiving unit is configured to use a wireless communication to receive the at least one image data.

3. The control apparatus according to claim 1, wherein the receiving unit is configured to use a near field wireless communication to receive the at least one image data.

4. The control apparatus according to claim 1, wherein the control apparatus is configured to act as one of a computer, a personal computer, a server, and a home server.

5. The control apparatus according to claim 1, wherein the external apparatus is configured to act as one of a digital camera, a digital video camera, and a mobile phone.

6. The control apparatus according to claim 1, wherein the predetermined time can be changed by a user.

7. A method comprising:
receiving at least one image data transmitted from an external apparatus to a control apparatus;
storing the at least one image data in a storage medium;
determining whether or not a predetermined instruction is inputted to the control apparatus after the control apparatus starts receiving the at least one image data from the external apparatus;
causing a display apparatus to display a menu that is used to help a user to play back the at least one image data if the predetermined instruction is inputted to the control apparatus after the control apparatus starts receiving the at least one image data from the external apparatus and before a predetermine time has elapsed;
determining whether or not the predetermined instruction is inputted to the control apparatus after the predetermined time has elapsed if the predetermined instruction is not inputted to the control apparatus within the predetermine time; and
causing the display apparatus to display a list of image data stored in the storage medium instead of displaying the menu if the predetermined instruction is not inputted to the control apparatus within the predetermine time but the predetermined instruction is inputted to the control apparatus after the predetermine time has elapsed.

8. The method according to claim 7, wherein the control apparatus is configured to use a wireless communication to receive the at least one image data.

9. The method according to claim 7, wherein the control apparatus is configured to use a near field wireless communication to receive the at least one image data.

10. The method according to claim 7, wherein the control apparatus is configured to act as one of a computer, a personal computer, a server, and a home server.

11. The method according to claim 7, wherein the external apparatus is configured to act as one of a digital camera, a digital video camera, and a mobile phone.

12. The method according to claim 7, wherein the predetermined time can be changed by a user.

13. A control apparatus comprising:
a receiving unit that receives at least one image data transmitted from an external apparatus to the control apparatus;
a storing unit that stores the at least one image data in a storage medium; and
a processor that (a) determines whether or not a display apparatus has changed to a predetermined state after the control apparatus starts receiving the at least one image data from the external apparatus, (b) causes the display apparatus to display a menu that is used to help a user to play back the at least one image data if the display apparatus has changed to the predetermined state after the control apparatus starts receiving the at least one image data from the external apparatus and before a predetermine time has elapsed, (c) determines whether or not the display apparatus has changed to the predetermined state after the predetermined time has elapsed if the display apparatus does not change to the predetermined state within the predetermine time, and (d) causes the display apparatus to display a list of image data stored in the storage medium instead of displaying the menu if the display apparatus does not change to the predetermined state within the predetermine time but the display apparatus has changed to the predetermined state after the predetermine time has elapsed,
wherein at least one of the receiving unit and the storing unit has a hardware structure.

14. The control apparatus according to claim 13, wherein the receiving unit is configured to use a wireless communication to receive the at least one image data.

15. The control apparatus according to claim 13, wherein the receiving unit is configured to use a near field wireless communication to receive the at least one image data.

16. The control apparatus according to claim 13, wherein the control apparatus is configured to act as one of a computer, a personal computer, a server, and a home server.

17. The control apparatus according to claim 13, wherein the external apparatus is configured to act as one of a digital camera, a digital video camera, and a mobile phone.

18. The control apparatus according to claim 13, wherein the predetermined time can be changed by a user.

19. A method comprising:
receiving at least one image data transmitted from an external apparatus to a control apparatus;
storing the at least one image data in a storage medium;
determining whether or not a display apparatus has changed to a predetermined state after the control apparatus starts receiving the at least one image data from the external apparatus;
causing the display apparatus to display a menu that is used to help a user to play back the at least one image data if the display apparatus has changed to the predetermined state after the control apparatus starts receiving the at least one image data from the external apparatus and before a predetermine time has elapsed;
determining whether or not the display apparatus has changed to the predetermined state after the predetermined time has elapsed if the display apparatus does not change to the predetermined state within the predetermine time; and
causing the display apparatus to display a list of image data stored in the storage medium instead of displaying the menu if the display apparatus does not change to the predetermined state within the predetermine time but the display apparatus has changed to the predetermined state after the predetermine time has elapsed.

20. The method according to claim 19, wherein the control apparatus is configured to use a wireless communication to receive the at least one image data.

21. The method according to claim 19, wherein the control apparatus is configured to use a near field wireless communication to receive the at least one image data.

22. The method according to claim 19, wherein the control apparatus is configured to act as one of a computer, a personal computer, a server, and a home server.

23. The method according to claim 19, wherein the external apparatus is configured to act as one of a digital camera, a digital video camera, and a mobile phone.

24. The method according to claim 19, wherein the predetermined time can be changed by a user.

25. A non-transitory storage medium that stores a program for causing a computer to execute a method, the method comprising:
receiving at least one image data transmitted from an external apparatus to a control apparatus;
storing the at least one image data in a storage medium;
determining whether or not a predetermined instruction is inputted to the control apparatus after the control apparatus starts receiving the at least one image data from the external apparatus;
causing a display apparatus to display a menu that is used to help a user to play back the at least one image data if the predetermined instruction is inputted to the control apparatus after the control apparatus starts receiving the at least one image data from the external apparatus and before a predetermine time has elapsed;
determining whether or not the predetermined instruction is inputted to the control apparatus after the predetermined time has elapsed if the predetermined instruction is not inputted to the control apparatus within the predetermine time; and
causing the display apparatus to display a list of image data stored in the storage medium instead of displaying the menu if the predetermined instruction is not inputted to the control apparatus within the predetermine time but the predetermined instruction is inputted to the control apparatus after the predetermine time has elapsed.

26. A non-transitory storage medium that stores a program for causing a computer to execute a method, the method comprising:
receiving at least one image data transmitted from an external apparatus to a control apparatus;
storing the at least one image data in a storage medium;
determining whether or not a display apparatus has changed to a predetermined state after the control apparatus starts receiving the at least one image data from the external apparatus;
causing the display apparatus to display a menu that is used to help a user to play back the at least one image data if the display apparatus has changed to the predetermined state after the control apparatus starts receiving the at least one image data from the external apparatus and before a predetermine time has elapsed;
determining whether or not the display apparatus has changed to the predetermined state after the predetermined time has elapsed if the display apparatus does not change to the predetermined state within the predetermine time; and
causing the display apparatus to display a list of image data stored in the storage medium instead of displaying the menu if the display apparatus does not change to the predetermined state within the predetermine time but the display apparatus has changed to the predetermined state after the predetermine time has elapsed.

* * * * *